(12) United States Patent
Indiresan et al.

(10) Patent No.: US 10,673,737 B2
(45) Date of Patent: Jun. 2, 2020

(54) MULTI-VRF UNIVERSAL DEVICE INTERNET PROTOCOL ADDRESS FOR FABRIC EDGE DEVICES

(71) Applicant: Cisco Technology, Inc., San Jose, CA (US)

(72) Inventors: Atri Indiresan, Sunnyvale, CA (US); Roberto Kobo, Pleasanton, CA (US); Sanjay Kumar Hooda, Pleasanton, CA (US); Akshay Sunil Dorwat, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 51 days.

(21) Appl. No.: 15/955,493

(22) Filed: Apr. 17, 2018

(65) Prior Publication Data
US 2019/0319871 A1    Oct. 17, 2019

(51) Int. Cl.
| H04W 56/00 | (2009.01) |
| H04L 12/715 | (2013.01) |
| H04L 12/723 | (2013.01) |
| H04L 29/12 | (2006.01) |
| H04L 12/721 | (2013.01) |
| H04L 12/713 | (2013.01) |

(52) U.S. Cl.
CPC ............ *H04L 45/04* (2013.01); *H04L 45/50* (2013.01); *H04L 45/586* (2013.01); *H04L 45/72* (2013.01); *H04L 61/1517* (2013.01); *H04L 61/2592* (2013.01)

(58) Field of Classification Search
CPC ....... H04L 45/04; H04L 45/50; H04L 45/586; H04L 45/72; H04L 61/1517; H04L 61/2592

USPC .......................................................... 370/401
See application file for complete search history.

(56) References Cited

U.S. PATENT DOCUMENTS

| 6,771,662 B1* | 8/2004 | Miki .................. H04L 49/3009 370/395.52 |
| 2006/0274723 A1* | 12/2006 | Siyavudeen ........ H04L 12/4641 370/352 |

(Continued)

FOREIGN PATENT DOCUMENTS

KR    20030094839 A    12/2003

OTHER PUBLICATIONS

Notification of Transmittal of the International Search Report and the Written Opinion of the International Searching Authority, or the Declaration issued in PCT/US2019/026803; dated Jun. 21, 2019 22 pps.

*Primary Examiner* — Sai Ming Chan
(74) *Attorney, Agent, or Firm* — Merchant & Gould P.C.

(57) ABSTRACT

Multi-VRF universal device Internet Protocol (IP) address for fabric edge devices may be provided. This address may be used to send and receive packets in a connectivity message for all VRFs on a fabric edge device. First, a request packet may be created by a first network device in response to receiving a connectivity message. The request packet may have a source address corresponding to an address of the first network device and a destination address corresponding to an address of a first client device. Next, the first network device may encapsulate the request packet. The first network device may then forward the encapsulated request packet to a second network device associated with the first client device.

20 Claims, 3 Drawing Sheets

(56) References Cited

U.S. PATENT DOCUMENTS

| | | | |
|---|---|---|---|
| 2007/0226630 A1* | 9/2007 | Farid | H04L 12/4641 715/734 |
| 2009/0116483 A1* | 5/2009 | Anumala | H04L 12/4633 370/392 |
| 2009/0129386 A1* | 5/2009 | Rune | H04L 12/2881 370/392 |
| 2010/0303073 A1* | 12/2010 | Kubo | H04L 12/1886 370/390 |
| 2015/0124805 A1* | 5/2015 | Yadav | H04L 47/50 370/389 |

* cited by examiner

MULTI-VRF UNIVERSAL DEVICE INTERNET PROTOCOL ADDRESS FOR FABRIC EDGE DEVICES

TECHNICAL FIELD

The present disclosure relates generally to multi-VRF universal device internet protocol addresses.

BACKGROUND

A computer network or data network is a telecommunications network that allows computers to exchange data. In computer networks, networked computing devices exchange data with each other using a data link. The connections between nodes are established using either cable media or wireless media. The best-known computer network is the Internet.

Network computer devices that originate, route, and terminate the data are called network nodes. Nodes can include hosts such as personal computers, phones, servers as well as networking hardware. Two such devices can be said to be networked together when one device is able to exchange information with the other device, whether or not they have a direct connection to each other. Computer networks differ in the transmission medium used to carry their signals, the communications protocols to organize network traffic, the network's size, topology, and organizational intent.

An enterprise fabric network may use a network overlay, which is a virtual network of interconnected nodes that share an underlying physical network. Examples of network overlays include Virtual Extensible LAN (VXLAN), Network Virtualization Using Generic Routing Encapsulation (NVGRE), Transparent Interconnection of Lots of Links (TRILL), and Location/Identifier Separation Protocol (LISP). LISP is a network architecture and a set of protocols that creates two namespaces and uses two IP addresses: Endpoint Identifiers (EIDs), which are assigned to end-hosts, and Routing Locators (RLOCs), which are assigned to network devices (e.g., routers) that make up the underlay routing system.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
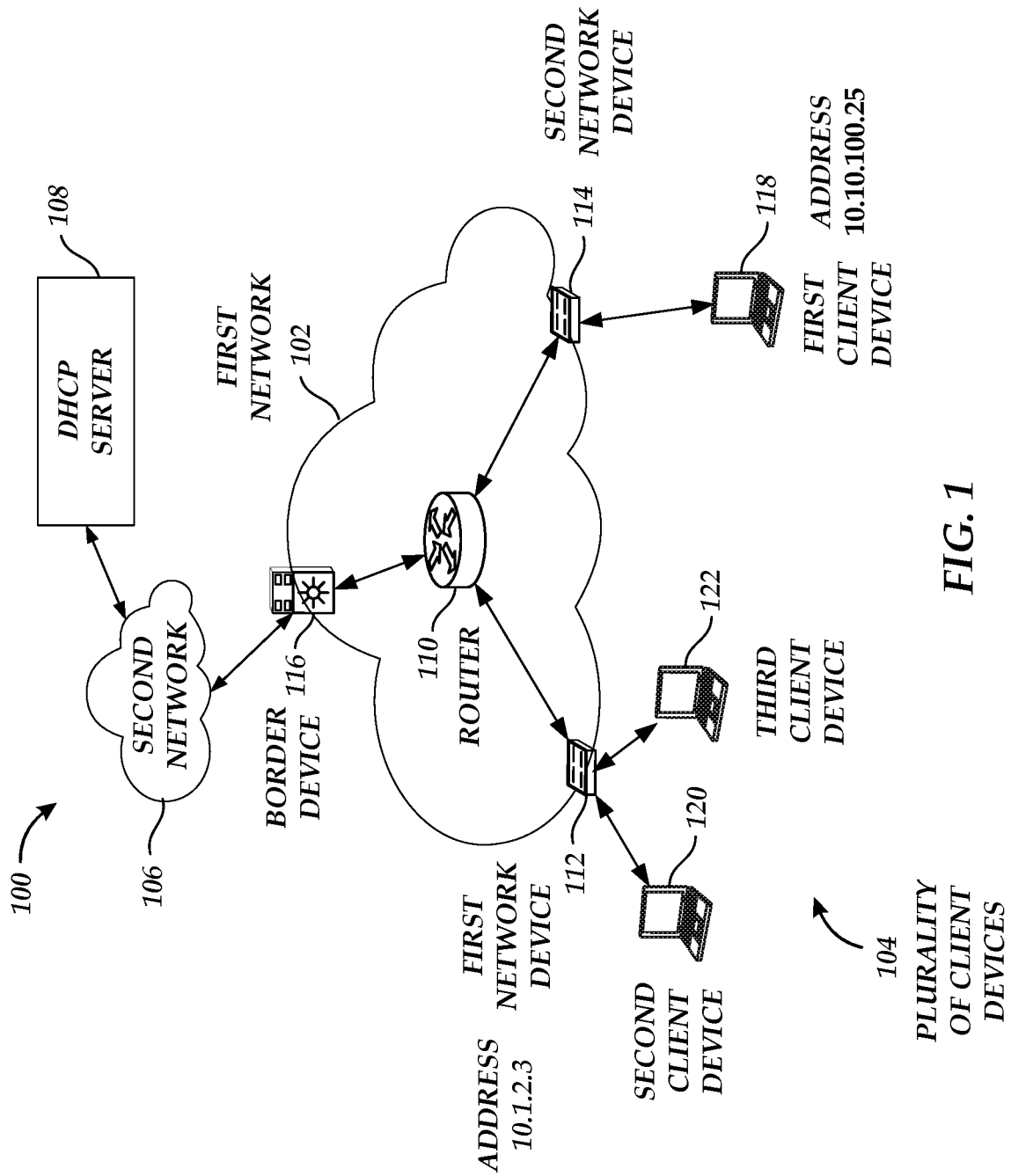
FIG. 1 shows a system for providing multi-VRF universal device Internet Protocol (IP) address for fabric edge devices.

Multi-VRF universal device Internet Protocol (IP) address for fabric edge devices may be provided. First, a request packet may be created by a first network device. The request packet may have a source address corresponding to an address of the first network device and a destination address corresponding to an address of a first client device. Next, the first network device may encapsulate the request packet. The first network device may then forward the encapsulated request packet to a second network device associated with the first client device. In another embodiment, the first network device may send a request packet to a second network device. The first network device may encapsulate the request packet. The first network device may then forward the encapsulated request packet to the second network device Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A fabric network may comprise a network topology in which components pass data to each other through interconnecting network nodes (e.g., devices). Fabric networks may comprise overlay and underlay. The underlay may deal with connectivity between fabric network devices and the overlay may deal with user traffic transiting the fabric network. The fabric network overlay may comprise functional components such as fabric edge (FE) devices, fabric intermediate devices, fabric border (FB) devices, and a map resolver/server.

In the fabric network overlay, FE devices may comprise, for example, Locator/ID Separation Protocol (LISP) xTR (Ingress/Egress Tunnel Router)/PxTR (Proxy xTR) nodes and FB devices may comprise, for example, LISP PxTR (Proxy xTR) nodes. End points (e.g., client devices including hosts) may be attached to the FE devices. The end points may be in endpoint identification (EID) space with each endpoint having an EID. Each device in the fabric network (e.g., FE devices and FB devices) may be configured with an address (e.g., a locator address). FE devices may register discovered EIDs (from the end points) with a fabric host-tracking database running on the map resolver/server associating the discovered EID to, for example, the configured locator address of the FE device that discovered it.

When a local FE device receives a packet from a local end point destined to a remote end point (i.e., on a remote FE device) whose location is not known, the local FE device may send a map request message to the map resolver/server. Once the local FE device receives a reply message back from the map resolver/server associating the unknown EID to the remote locator address, all subsequent traffic from the local end point may be encapsulated (e.g., LISP encapsulated) and forwarded to the remote locator address (i.e., remote FE device). Once the encapsulated packet is received on the remote FE device, the remote FE device may decapsulate the packet and forward natively (e.g., to the remote endpoint).

IP overlay fabric networks, such as Virtual Extensible Local Area Network (VxLAN) or LISP, may be a popular network topology to transport end-user Layer-2 and Layer-3 traffic. Client devices in the overlay may connect to the FE devices (VXLAN tunnel endpoints (VTEPs) in VxLAN or Ingress Tunnel Routers (ITRs)/Egress Tunnel Routers (ETRs) in LISP) that may encapsulate data packets at an ingress Fabric Edge in an outer IP header for transport over the underlay IP network to the egress FE device where they are decapsulated and forwarded to a final destination.

When the fabric provides a Layer-3 service, Address Resolution Protocol (ARP) from the client may be resolved at the ingress FE, which may be a default Layer-3 gateway. In a stretched Layer-3 network, the same subnet may be present at multiple (or all) FEs. This may be useful because the IP subnet may no longer be associated with a physical location, and it may enable mobility of client devices without having to obtain a new IP address. However, after a mobility event, a client device may be associated with a new FE, and consequently, a new default gateway. In order to facilitate this mobility seamlessly without repeating ARP at the new location, all FE devices may share a common anycast gateway IP and MAC address. With this, from the client device's perspective, there has been no mobility (i.e., mobility occurred seamlessly).

Client devices may comprise overlay devices and may be in different Virtual Routing and Forwarding groups (VRFs) (i.e., subnets) based on function and segmentation requirements. They may be connected to an FE device over a Switched/Bridged Virtual Interface (SVI/BVI) as below:

```
interface vlan 100
    ip vrf forwarding vpn100
    ip address 10.10.100.1 255.255.255.0
interface vlan 200
    ip vrf forwarding vpn100
    ip address 10.10.101.1 255.255.255.0
```

In the above example, the anycast gateway IP addresses are 10.10.100.1 and 10.10.101.1 for VLANs 100 and 200, respectively. These may be configured on the corresponding SVIs on each FE devices with that VLAN. The client IP addresses are in VRF vpn100, and in the subnets 10.10.100.0/24 and 10.10.101.0/24. There can be one or more VLANs in a VRF. In this example, both SVIs share the same VRF, but they could be different as well. The SVI IP addresses may be thought of as the common identity of the FEs as seen by all clients in that VLAN independent of the FE it is connected to. This SVI IP address may be the anycast IP address described above.

As described above, to support mobility, it may be an advantage for the fabric to present a uniform identify to client devices, no matter which FE device they are associated with (i.e., an anycast gateway IP address). There may be many applications in which they need to present an identity to non-client devices. In this case, a problem may occur in that the non-client devices may not be able to distinguish between FE devices and thus responses may be sent to an incorrect FE device.

An example of this problem may comprise sending a VRF ping from one FE device to a remote client device. In this example, the remote client device may have an IP address of 10.10.100.25 and may be associated with a second FE device. A first FE device may send a ping as below:
    ping ip vrf vpn100 10.10.100.25
As such, the first FE device may construct an Internet Control Message Protocol (ICMP) request packet with the source IP as its address in vpn100 (i.e., the anycast gate IP address 10.10.100.1). The ICMP request packet may be encapsulated and transported to the second FE device where it may be decapsulated and forwarded to the remote client. The remote client may send an ICMP reply to 10.10.100.1, which is also the anycast gateway address on the second FE device. Hence, the second FE device receives the reply and not the first FE device. Accordingly, the ping in this example fails. It is worse when trying to ping a remote FE device in the VRF, the ping terminates locally and appears to succeed since both FE devices share the same anycast IP address.

One solution to this problem would be to create a loopback interface on each FE device with a unique IP address in the same VRF, and use that address for ping (or other applications). This approach does not scale well. It is expensive to create a loopback address for each VRF on each FE device, in terms of the amount of configuration, as well as the number of IP addresses consumed, and number of entries in the forwarding tables. A typical fabric network may have over 100 VRFs and over 1000 FE devices, resulting in an additional 100,000 entries, or more. It may be common for conventional FE devices to support fewer addresses, e.g., may only support 8000 subnet entries, and 8000 host routes, thus making such a solution infeasible.

FIG. 1 shows a system 100 consistent with embodiments of the disclosure for providing multi-VRF universal device Internet Protocol (IP) address for fabric edge devices. As shown in FIG. 1, system 100 may comprise a first network 102, a plurality of client devices 104, and a second network 106. First network 102 may comprise a plurality of network devices including, but not limited to, a router 110, a first network device 112, a second network device 114, intermediate network devices (e.g., router 110), and a border device 116. Plurality of client devices 104 may comprise a first client device 118, a second client device 120, and a third client device 122. Second network 106 may comprise a network outside first network 102, for example, the Internet.

As shown in FIG. 1, first network device 112 may have a universal IP address (e.g., 10.1.2.3), second network device 114 may have a universal IP address (e.g., 10.1.2.4), and border device 116 may have a universal IP address (e.g., 10.1.2.5). Each of these universal IP addresses may be reachable by all VRFs on each of the aforementioned respective device. Each of first network device 112, second network device 114, and border device 116 may have the same anycast IP address (e.g., 10.10.100.1).

System 100 may use the Open Systems Interconnection (OSI) model that characterizes and standardizes the communication functions of a telecommunication or computing system without regard to its underlying internal structure and technology. As such, communications over system 100 may comprise Layer-1 data, Layer-2 data, and Layer-3 data. Layer-1 may provide services to transmit bits or groups of bits over a transmission link between open systems and which entails electrical, mechanical, and handshaking procedures. Layer-2 may comprise the data link layer and may provide node-to-node data transfer. Layer-3 may comprise the network layer and may provide the functional and procedural means of transferring variable length data sequences (i.e., datagrams) from one device to another.

A plurality of network devices in network 102 may comprise, but are not limited to, switches and routers for example. Network 102 may comprise any number of network devices. Plurality of client devices 104 may comprise any number of client devices and is not limited to three. Each of plurality of client devices 104 may comprise any type device wishing to communicate over network 102. For example, each of plurality of client devices 104 may comprise, but are not limited to, a Wi-Fi access point, a cellular base station, a tablet device, a mobile device, a smart phone, a telephone, a remote control device, a set-top box, a digital video recorder, a cable modem, a personal computer, a network computer, a mainframe, a router, or other similar microcomputer-based device.

Network 102 may comprise a fabric network. The fabric network may comprise an underlay and an overlay. The underlay may deal with connectivity between fabric elements (e.g., network devices) and the overlay may deal with user traffic entering the fabric. Traffic may enter the fabric network (i.e., network 102) through Fabric Edge (FE) devices (e.g., first network device 112, second network device 114, and border device 116). In other words, first network device 112 may comprise a first fabric edge device and second network device 114 may comprise a second fabric edge device. The traffic may be routed through network 102 via a plurality of intermediate network devices within the plurality of network devices. The FE devices may be responsible for encapsulating a packet with a fabric header that contains an egress FE device address. When a packet (e.g., frame) arrives at the egress FE device, a fabric header may be stripped off and the native packet may be forwarded according to an inner address. The fabric network may be capable of providing Layer-2 and Layer-3 services on top of the underlay. The fabric network may have endpoints (e.g., plurality of client devices 104) connected to it.

Fabric networks may use a plurality of anycast address that are available across all the FE nodes. Each VLAN may have a unique anycast address, and the anycast address may be present at each of the plurality of FE devices. An anycast address may be used as the default anycast gateway IP address for the plurality of client devices on the corresponding VLAN, independent of the FE device to which it may be connected.

Figure 2:
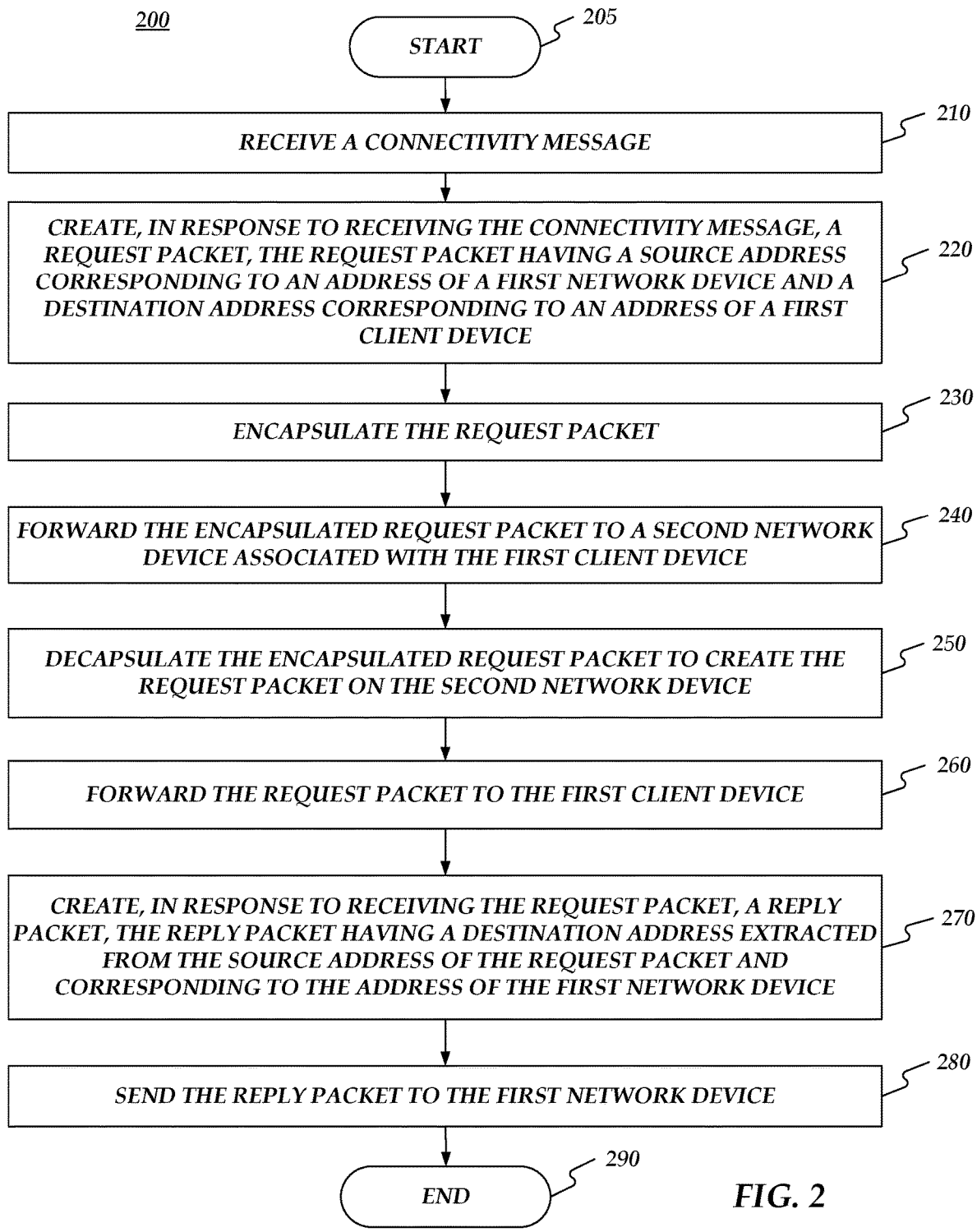
FIG. 2 is a flow chart of a method for providing multi-VRF universal device IP address for fabric edge devices.

FIG. 2 is a flow chart setting forth the general stages involved in a method 200 consistent with an embodiment of the disclosure for providing multi-VRF universal device Internet Protocol (IP) address for fabric edge devices. Method 200 may be implemented using first network device 112 and second network device 114 as described in more detail below with respect to FIG. 1. A computing device 300, as described in more detail below with respect to FIG. 3, may comprise an operating environment for first network device 112 or second network device 114. Ways to implement the stages of method 200 will be described in greater detail below.

Method 200 may begin at starting block 205 and proceed to stage 210 where first network device 112 may receive a connectivity message. For example, the connectivity message may comprise a ping request that seeks to ping a remote client device (e.g., first client device 118) associated with second network device 114. This connectivity message may be an IP packet and may comprise a source IP address corresponding to first network device 112 and a destination IP address corresponding to first client device 118. The connectivity message may be initiated by a system administrator and may be initiated from a network controller (not shown) or may be initiated directly at first network device 112 through a Command Line Interface (CLI) for example.

From stage 210, where first network device 112 receives the connectivity message, method 200 may advance to stage 220 where first network device 112 may create, in response to receiving the connectivity message, a request packet. The request packet may comprise, but is not limited to, an Internet Control Message Protocol (ICMP) request packet. The request packet may have a source address corresponding to an address of first network device 112 and a destination address corresponding to an address of first client device 118. Consistent with embodiments of the disclosure, each FE device (e.g., first network device 112 and second network device 118) may have a unique universal IP address that may be shared by all VRFs present on the FE device. Thus the aforementioned source address may comprise the unique universal IP address for first network device 112. In this example, the unique universal IP address for first network device 112 may comprise 10.1.2.3. To express this, a special interface with this universal IP address may be created (i.e., installed):

```
interface loopback0
    ip vrf all
        ip address 10.1.2.3 255.255.255.255
```

Alternatively, since this may be specific to Software-Defined Access (SDA), which is based on a LISP control plane, the universal IP address could be part for the LISP CLI. For example:

```
router lisp
    service ipv4
        interface loopback0 vrf all
```

In this example, this FE (i.e., first network device 112) has IP address 10.1.2.3 that may be used for all VRFs on this network device. The same IP address may not be used on other devices and a small range of IP addresses may be reserved for this purpose. For example, this universal IP address may comprise the network device's (i.e., FE device's) Router Locator (RLOC) that may be unique. Consequently, the ping may look like the following shown below.

ping ip vrf vpn100 10.10.100.25 source 10.1.2.3

The request packet may include data extracted from this ping, for example, the universal IP address of first network device 112 (e.g., 10.1.2.3) as the source IP address, and the address of the first client device (i.e. 100.10.10.25) as the destination IP address. Since 10.1.2.3 may be unique, unlike the ping having the shared common anycast gateway IP address as described above, the below ping may complete successfully consistent with embodiments of the disclosure as described in more detail below.

Once first network device 112 creates the request packet in stage 220 with the source IP address as the universal IP address of the first network device (i.e. 10.1.2.3) and a destination IP address of the first client device (i.e., 100.10.10.25), method 200 may continue to stage 230 where first network device 112 may encapsulate the request packet. For example, first network device 112 may encapsulate the request packet at this ingress FE device in an outer IP header for transport over the underlay of network 102. The outer IP header may comprise a source IP address as the universal IP address of first network device 112 (i.e., 10.1.2.3) and a destination IP address as the universal IP address of second network device 114 (i.e., 10.1.2.4).

After first network device 112 encapsulates the request packet in stage 230, method 200 may proceed to stage 240 where first network device 112 may forward the encapsulated request packet to second network device 114 associated with first client device 118. For example, first network device 112 may forward the encapsulated request packet over the underlay of network 102 to the egress FE device (i.e., second network device 114).

From stage 240, where first network device 112 forwards the encapsulated request packet to second network device 114, method 200 may advance to stage 250 where second network device 114 may decapsulate the encapsulated request packet (i.e., remove the outer IP header described above) to create the original request packet on second network device 114.

Once second network device 114 decapsulates the encapsulated request packet in stage 250, method 200 may continue to stage 260 where second network device 114 may forward the request packet to first client device 118. For example, the egress FE device (i.e., second network device 114) may decapsulate the encapsulated request packet and forward it to its final destination (i.e., first client device 118).

After second network device 114 forwards the request packet to first client device 118 in stage 260, method 200 may proceed to stage 270 where first client device 118 may create, in response to receiving the request packet, a reply packet. The reply packet may comprise an Internet Control Message Protocol (ICMP) reply packet. The reply packet may have a destination address extracted from the source address of the request packet and corresponding to the address of first network device 112. In this example, the reply packet may have a source IP address of first client device 118 (i.e., 10.10.100.25) and a destination IP address as the universal IP address of first network device 112 (i.e., 10.1.2.3).

From stage 270, where first client device 118 creates the reply packet, method 200 may advance to stage 280 first client device 118 may send the reply packet to first network device 112. For example, as stated above, the ingress FE device originally initiating the ping (i.e., first network device 112) has the IP address 10.1.2.3 that may be used for all VRFs on this network device. The same IP address may not be used on other devices. The reply packet may include data extracted from the request packet, for example, the universal IP address of first network device 112 (e.g., 10.1.2.3). Since 10.1.2.3 may be unique, unlike the ping having the shared common anycast gateway IP address as described above, a ping consistent with embodiments of the disclosure may complete successfully and return to the device originally initiating the ping (i.e., first network device 112).

For example, first client device 118 may send the reply packet (e.g., reply to the ping) to second network device 114 where second network device 114 may encapsulate the reply packet at this ingress FE device in an outer IP header for transport over the underlay of network 102. The outer IP header may comprise a source IP address as the universal IP address of second network device 118 (i.e., 10.1.2.4) and a destination IP address as the universal IP address of first network device 112 (i.e., 10.1.2.3).

After second network device 114 encapsulates the reply packet, second network device 114 may forward the encapsulated reply packet to first network device 112. For example, second network device 114 may forward the encapsulated reply packet over the underlay of network 102 to the egress FE device (i.e., first network device 112).

Once second network device 114 forwards the encapsulated reply packet to first network device 112, first network device 112 may decapsulate the encapsulated reply packet (i.e., remove the outer IP header described above) to create the original reply packet on first network device 112. Thus, consistent with embodiments of the disclosure, the ping may be completed by its successful return to the device originally initiating the ping (i.e., first network device 112). Method 200 may then end at stage 290.

The aforementioned process may also be used to send pings between network devices in first network 102. For example, first network device 112 may ping second network device 114. In this case, the request packet may have a source address corresponding to an address of first network device 112 (e.g., first network device 112's universal IP address, e.g., 10.1.2.3) and a destination address corresponding to an address of second network device 114 (e.g., second network device 114's universal IP address, e.g., 10.1.2.4).

Regarding routing, an implementation may be to distribute the unique universal IP address of all FE devices on all VRFs; however, this could lead to an explosion in the number of routes (i.e., the number of FE devices times the number of VRFs). To solve this problem, consistent with embodiments of the disclosure, only a single address per FE device may be distributed with an indication that it is universal across all VRFs. While it may be possible to distribute this IP address via any routing protocol (OSPF, RIP, IS-IS etc.), this might not be practical due to the diversity of available protocols and the impact on code. Instead, for example, this may be distributed using a protocol that is specifically designed to manage the fabric, such as LISP or Border Gateway Protocol Ethernet Virtual Private Network (BGP-EVPN).

Regarding forwarding, consider the solution for VxLAN, which may be similar for other overlays. Consistent with embodiments of the disclosure, one way to solve forwarding may be to use a Ternary Content-Addressable Memory (TCAM). In a Layer-3 IP forwarding lookup, a key may comprise (VRF, destination-IP). Embodiments of the disclosure may install an entry with key (*, destination-IP) (i.e., the VRF field is a "don't care"). Since a route to a destination FE device across the underlay may be the same for all VRFs, the adjacency may be shared and so a single forwarding entry may be sufficient. In order to populate the Virtual Network Instance (VNI) field in the VxLAN header, a VRF-to-VNI translation table may be used. Accordingly, consistent with embodiments of the disclosure, instead of having a number of forwarding entries equal to the number of FE devices times the number of VRFs, the number of forwarding entries may be reduced to the number of FE devices (for the universal IP addresses) plus the number of VRFs (for the VRF to VNI translation). In the example where there are 1,000 FE devices and 100 VRFs, the number of forwarding entries goes down from 100,000 forwarding entries to 1100.

While some FE devices may implement a Forwarding Information Base (FIB) table with a TCAM, other platforms may use a Radix tree or M-trie. Consider a 12 bit VRF and 32 bit IPv4 lookup split up as (20+8+8+8). In this case, one entry per VRF may be needed in the top level tree assuming all the FE device IP addresses share the same first 8 bits. The remaining levels of the tree can be shared and resource consumption may be minimized. While the TCAM implementation may be used, this is solvable for multiple forwarding structures.

Embodiments of the disclosure may apply to any IP overlay such as VxLAN, LISP, and Generic Routing Encapsulation (GRE) for example. Multiprotocol Label Switching (MPLS) may also be used because the IP address may map onto the same tunnel label stack on all VRFs. However, it may be more efficient to have a universal per-VRF VPN label at all Provider Edge devices or an explosion in the number of VPN labels may ensue.

Regarding scaling, with conventional VRF configurations where the same IP address across all the VRFs on the device are used, or unique ones, the scale requirement may be similar (i.e., the number of FE devices times the number of VRFs). With this implementation, because the address be guaranteed to be the same, the process to optimize the FIB as well as the route distribution apply.

Accordingly, embodiments of the disclosure may provide a universal IP address for an FE device shared across all VRFs. This may present a uniform identify for the FE device and may enable many applications that require a unique identify for FE device-to-FE device communication and may do so in a scalable, efficient manner. While there are many routing options possible, implementation may use fabric control protocols such as LISP and/or BGP-EVPN.

Figure 3:
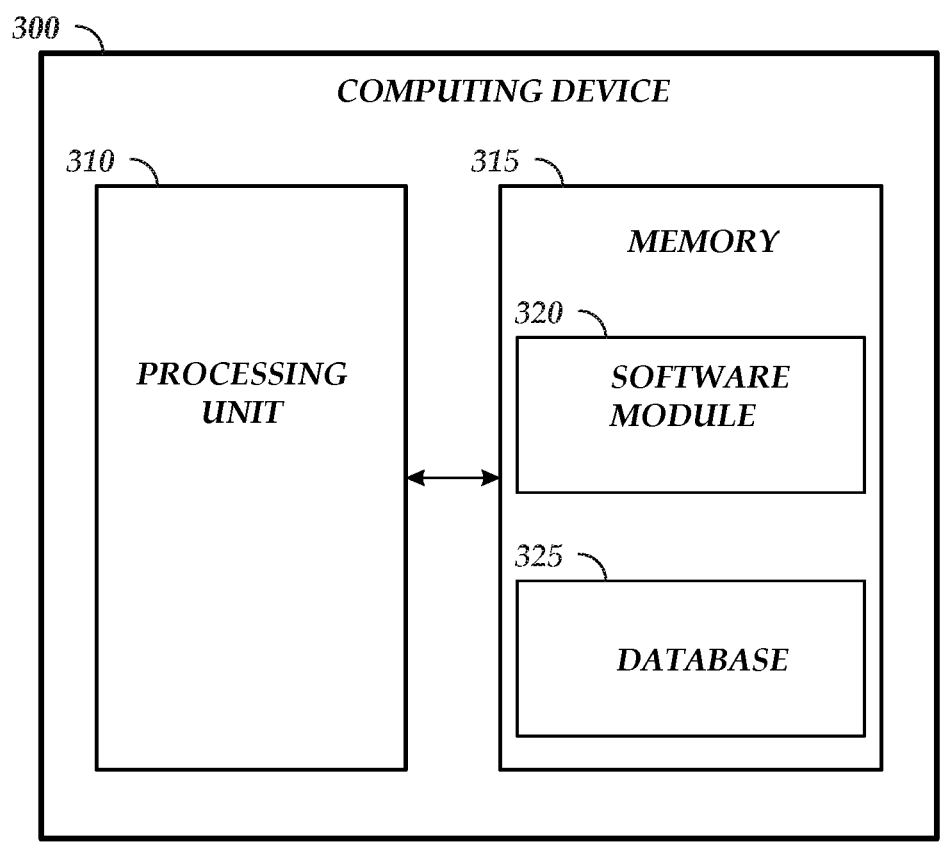
FIG. 3 shows a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform processes for providing multi-VRF universal device Internet Protocol (IP) address for fabric edge devices, including for example, any one or more of the stages from method 200 described above with respect to FIG. 2. Computing device 300, for example, may provide an operating environment for any of router 110, first network device 112, second network device 114, border device 116, first client device 118, second client device 120, or third client device 122. Router 110, first network device 112, second network device 114, border device 116, first client device 118, second client device 120, or third client device 122 may operate in other environments and are not limited to computing device 300.

Computing device 300 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, or other similar microcomputer-based device. Computing device 300 may comprise any computer operating environment, such as hand-held devices, multi-processor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including, but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   creating, by a first network device in response to receiving a connectivity message, a request packet, the request packet having a source address corresponding to an address of the first network device and a destination address corresponding to an address of a first client device, wherein the source address comprises a universal address for the first network device that is reachable by all Virtual Routing and Forwarding groups (VRFs) on the first network device, wherein the first network device further comprises a forwarding table for the all VRFs on the first network device, wherein a number of entries in the forwarding table comprises a number of network devices in a fabric network associated with the first network device and a number of VRFs associated with the first network device, and wherein the forwarding table comprises a VRF to a Virtual Network Instance (VNI) table;
   encapsulating, by the first network device, the request packet; and
   forwarding, by the first network device, the encapsulated request packet to a second network device associated with the first client device.

2. The method of claim 1, further comprising:
   creating the universal address for the first network device that is reachable by the all VRFs on the first network device; and
   installing, in a routing table, a forwarding entry for the universal address for the first network device, wherein the forwarding entry is useable by the all VRFs on the first network device.

3. The method of claim 1, further comprising:
   decapsulating, by the second network device, the encapsulated request packet to create the request packet on the second network device;
   forwarding, by the second network device, the request packet to the first client device;
   creating, by the first client device in response to receiving the request packet, a reply packet, the reply packet having a destination address extracted from the source address of the request packet and corresponding to the address of the first network device; and
   sending, by the first client device, the reply packet to the first network device.

4. The method of claim 3, wherein sending the reply packet to the first network device comprises looking up, in a routing table, a route to the first network device wherein a key used in looking up the route comprises only the address of the first network device, wherein the address of the first network device comprise the address of the first network device in an underlay of the fabric network connecting the first network device and the second network device.

5. The method of claim 4, wherein looking up the route in the routing table comprises looking up the route in the routing table comprising a lookup table in Layer-3 of the Open Systems Interconnection (OSI) model.

6. The method of claim 3, wherein sending the reply packet comprise sending the reply packet comprising an Internet Control Message Protocol (ICMP) reply packet.

7. The method of claim 1, wherein creating the request packet having the source address corresponding to the address of the first network device comprises creating the request packet having the source address corresponding to the address of the first network device wherein the source address corresponding to the address of the first network device comprises an address of the first network device in an underlay of the fabric network connecting the first network device and the second network device.

8. The method of claim 1, wherein creating the request packet having the destination address corresponding to the address of the first client device comprises creating the request packet having the destination address corresponding to the address of the first client device wherein the destination address corresponding to the address of the first client device comprises an address of the first client device in an overlay of a network connecting the first network device and the second network device.

9. The method of claim 1, wherein creating the request packet comprise creating the request packet comprising an Internet Control Message Protocol (ICMP) request packet.

10. The method of claim 1, further comprising installing, in a routing table, a route to the first network device wherein a key for the installed route to the first network device comprises a don't care value in a field corresponding to a VRF and an address value in a field corresponding to a destination address, the address value comprising an address of the first network device in an underlay of the fabric network connecting the first network device and the second network device.

11. The method of claim 10, wherein installing the route in the routing table comprises installing the route in the routing table comprising lookup table in Layer-3 of the Open Systems Interconnection (OSI) model.

12. A method comprising:
   creating a universal address for a first network device that is reachable by all Virtual Routing and Forwarding groups (VRFs) on the first network device, wherein the first network device further comprises a forwarding table for the all VRFs on the first network device, wherein a number of entries in the forwarding table comprises a number of network devices in a fabric network associated with the first network device and a number of VRFs associated with the first network device, and wherein the forwarding table comprises a VRF to a Virtual Network Instance (VNI) table; and
   installing, in a routing table, a forwarding entry for the universal address for the first network device, wherein the forwarding entry is useable by the all VRFs on the first network device.

13. The method of claim 12, further comprising:
   creating, by the first network device in response to receiving a connectivity message, a request packet, the request packet having a source address corresponding to an address of the first network device and a destination address corresponding to an address of a first client device, wherein the source address comprises the universal address for the first network device that is reachable by the all VRFs on the first network device;
   encapsulating, by the first network device, the request packet; and
   forwarding, by the first network device, the encapsulated request packet to a second network device associated with the first client device.

14. The method of claim 13, further comprising:
decapsulating, by the second network device, the encapsulated request packet to create the request packet on the second network device;
forwarding, by the second network device, the request packet to the first client device;
creating, by the first client device in response to receiving the request packet, a reply packet, the reply packet having a destination address extracted from the source address of the request packet and corresponding to the address of the first network device; and
sending, by the first client device, the reply packet to the first network device.

15. The method of claim 14, wherein sending the reply packet to the first network device comprises looking up, in the routing table, a route to the first network device wherein a key used in looking up the route comprises only the universal address for the first network device.

16. The method of claim 15, wherein sending the reply packet comprise sending the reply packet comprising an Internet Control Message Protocol (ICMP) reply packet.

17. An apparatus comprising:
a memory storage; and
a processing unit coupled to the memory storage, wherein the processing unit is disposed in a first network device and the processing unit is operative to:
create, in response to receiving a connectivity message, a request packet, the request packet having a source address corresponding to an address of the first network device and a destination address corresponding to an address of a first client device, wherein the source address comprises a universal address for the first network device that is reachable by all Virtual Routing and Forwarding groups (VRFs) on the first network device, wherein the first network device further comprises a forwarding table for the all VRFs on the first network device, wherein a number of entries in the forwarding table comprises a number of network devices in a fabric network associated with the first network device and a number of VRFs associated with the network device, and wherein the forwarding table comprises a VRF to a Virtual Network Instance (VNI) table;
encapsulate the request packet; and
forward the encapsulated request packet to a second network device associated with the first client device.

18. The apparatus of claim 17, wherein the source address corresponding to the address of the first network device comprises an address of the first network device in an underlay of a network connecting the first network device and the second network device.

19. The apparatus of claim 17, wherein the destination address corresponding to the address of the first client device comprises an address of the first client device in an overlay of a network connecting the first network device and the second network device.

20. The apparatus of claim 17, wherein the processing unit is further operative to install, in a routing table, a route to the first network device wherein a key for the installed route to the first network device comprises a don't care value in a field corresponding to a subnet and an address value in a field corresponding to a destination address, the address value comprising an address of the first network device in an underlay of the fabric network connecting the first network device and the second network device.

* * * * *